United States Patent
Seo et al.

(10) Patent No.: US 9,289,970 B2
(45) Date of Patent: Mar. 22, 2016

(54) APPARATUS AND METHOD FOR PEELING PROTECTIVE FILM AND METHOD FOR FABRICATING STEREOSCOPIC IMAGE DISPLAY DEVICE

(71) Applicant: LG DISPLAY CO., LTD., Seoul (KR)

(72) Inventors: SangHo Seo, Goyang (KR); SungJin Kim, Paju (KR)

(73) Assignee: LG DISPLAY CO., LTD., Seoul (KR)

( * ) Notice: Subject to any disclaimer, the term of this patent is extended or adjusted under 35 U.S.C. 154(b) by 270 days.

(21) Appl. No.: 13/690,669

(22) Filed: Nov. 30, 2012

(65) Prior Publication Data

US 2013/0133839 A1 May 30, 2013

(30) Foreign Application Priority Data

Nov. 30, 2011 (KR) .................. 10-2011-0127171

(51) Int. Cl.
*B32B 38/10* (2006.01)
*B32B 43/00* (2006.01)

(52) U.S. Cl.
CPC ............... *B32B 43/006* (2013.01); *B32B 38/10* (2013.01); *B32B 2457/20* (2013.01); *Y10T 156/1168* (2015.01); *Y10T 156/1174* (2015.01); *Y10T 156/195* (2015.01); *Y10T 156/1978* (2015.01)

(58) Field of Classification Search
CPC .. B32B 43/006; B32B 38/10; Y10T 156/707; Y10T 156/714; Y10T 156/715; Y10T 156/758; Y10T 156/759; Y10T 156/76; Y10T 156/764; Y10T 156/766
USPC ......... 156/707, 714, 715, 758, 759, 760, 764, 156/766
See application file for complete search history.

(56) References Cited

U.S. PATENT DOCUMENTS

| | | | | |
|---|---|---|---|---|
| 5,656,127 | A * | 8/1997 | De Niel et al. ................. | 156/764 |
| 8,756,783 | B2 * | 6/2014 | Lu et al. ......................... | 29/426.1 |
| 2007/0151667 | A1 * | 7/2007 | Tani et al. ...................... | 156/344 |
| 2008/0185100 | A1 * | 8/2008 | Jang et al. ...................... | 156/344 |
| 2008/0236743 | A1 * | 10/2008 | Kye et al. ....................... | 156/344 |
| 2012/0090786 | A1 * | 4/2012 | Jeong et al. .................... | 156/350 |
| 2012/0312481 | A1 * | 12/2012 | Kang et al. ..................... | 156/715 |
| 2013/0048223 | A1 * | 2/2013 | Ahn ............................... | 156/718 |
| 2014/0076501 | A1 * | 3/2014 | Kim et al. ...................... | 156/760 |
| 2014/0290864 | A1 * | 10/2014 | Ahn ............................ | 156/379.8 |
| 2014/0367050 | A1 * | 12/2014 | Burgel ........................... | 156/719 |

* cited by examiner

Primary Examiner — Mark A Osele
(74) Attorney, Agent, or Firm — Brinks Gilson & Lione

(57) ABSTRACT

A film member attached to the outer peripheral surface of a cylindrical plate is fixed by a peeling roller and a clamp of a peeling unit and peeled from the cylindrical plate by moving the peeling unit, and the intervals between each of the peeling units and the outer peripheral surface of the cylindrical plate are same so that the contact portions of the peeling rollers are variable.

16 Claims, 18 Drawing Sheets

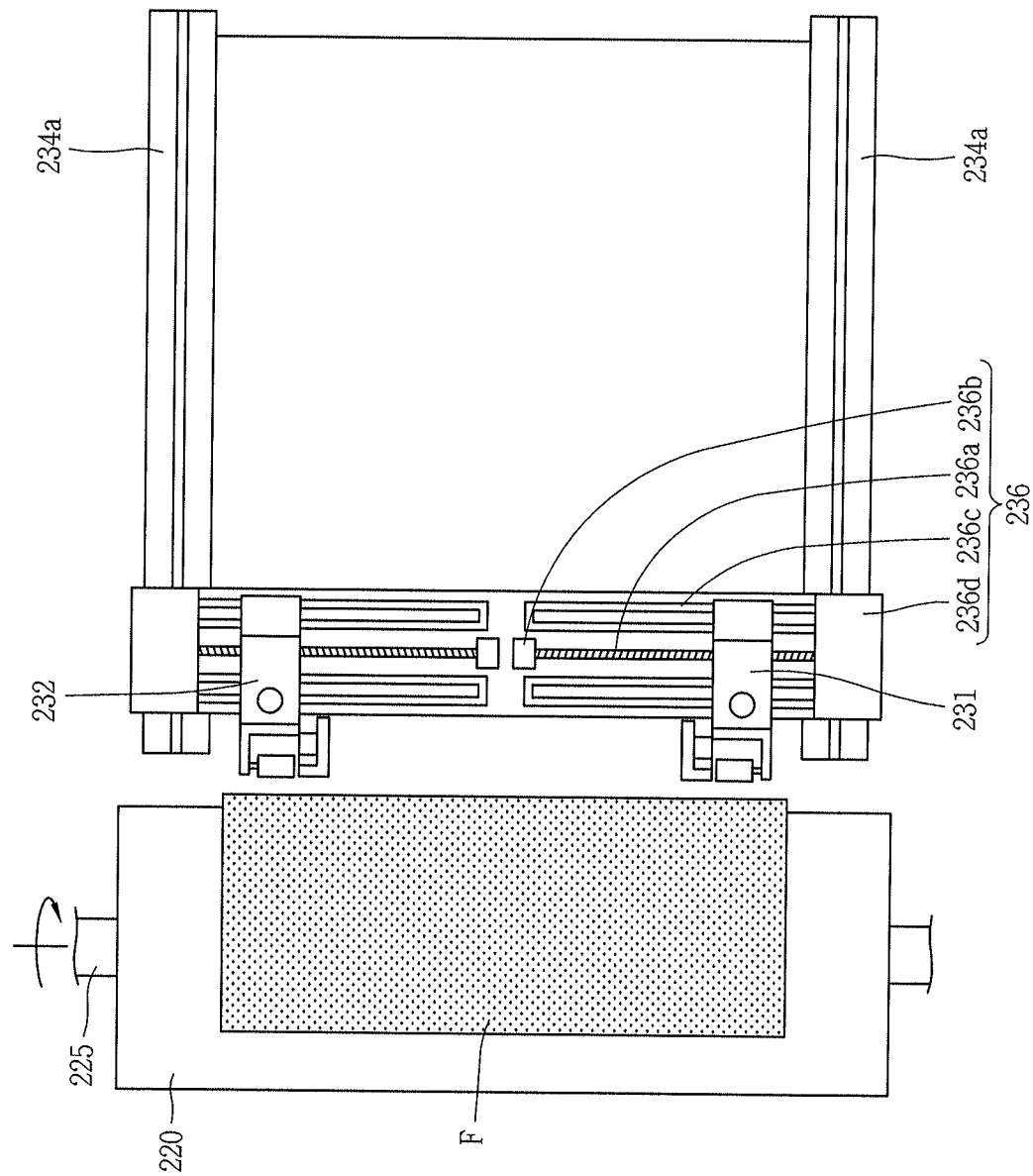

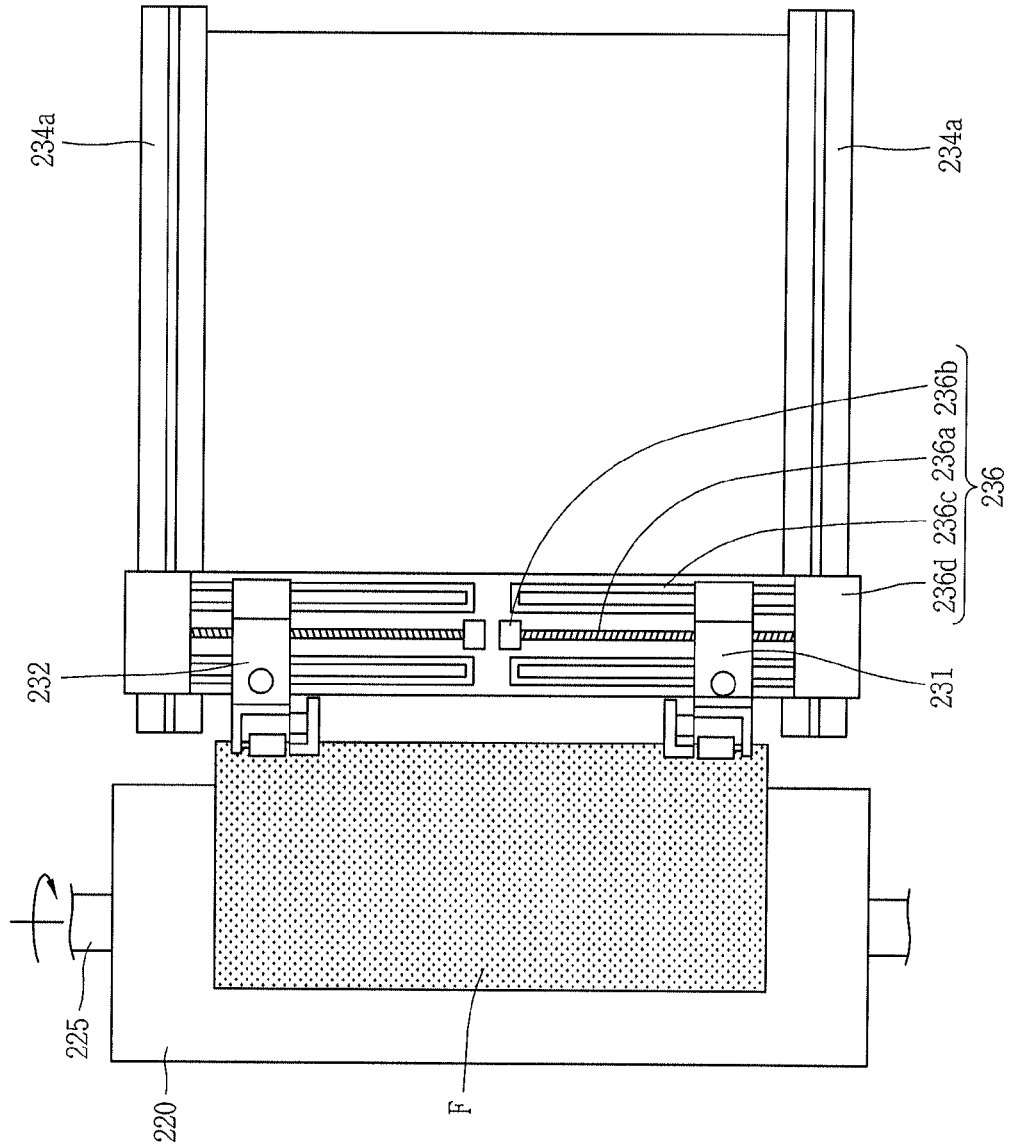

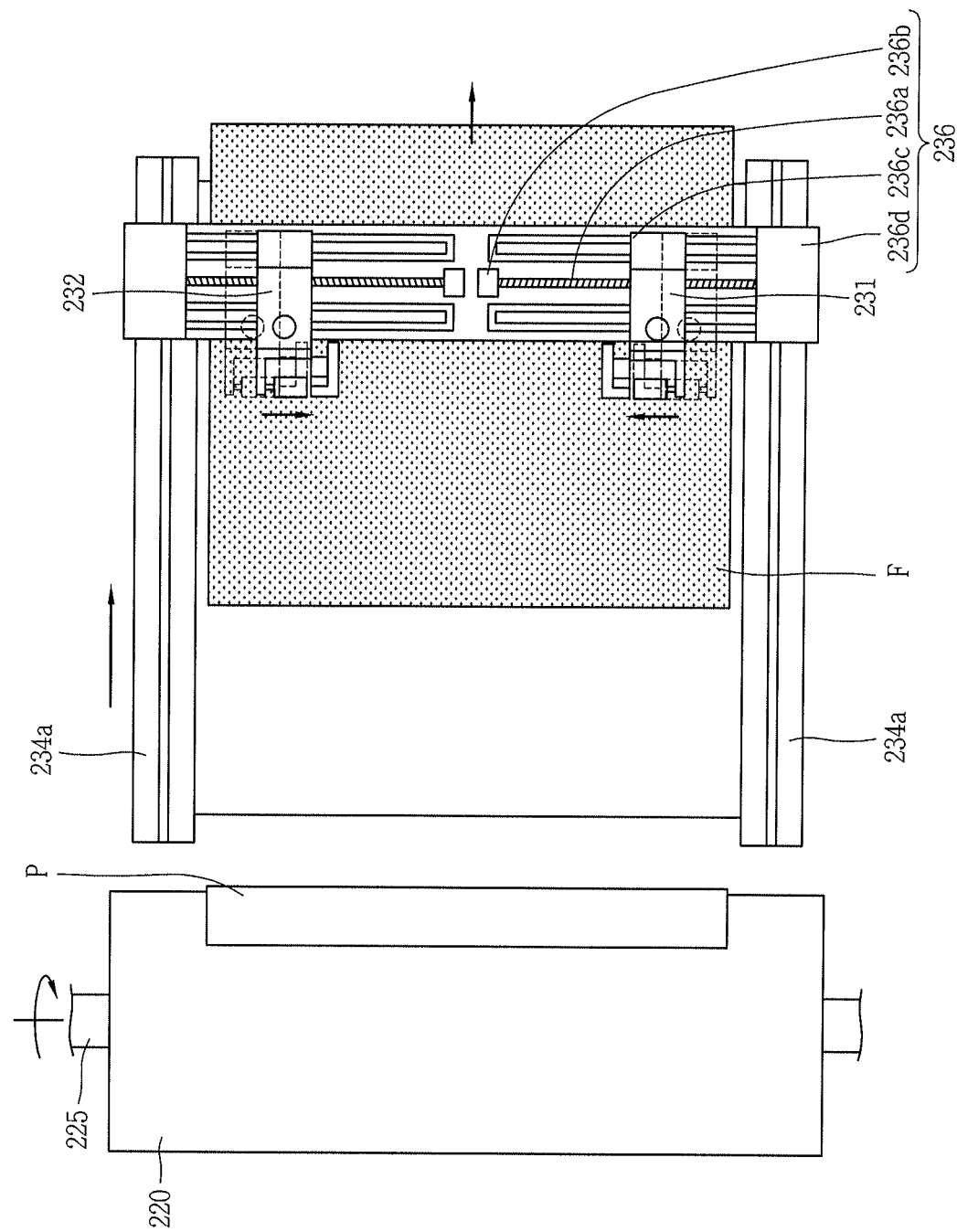

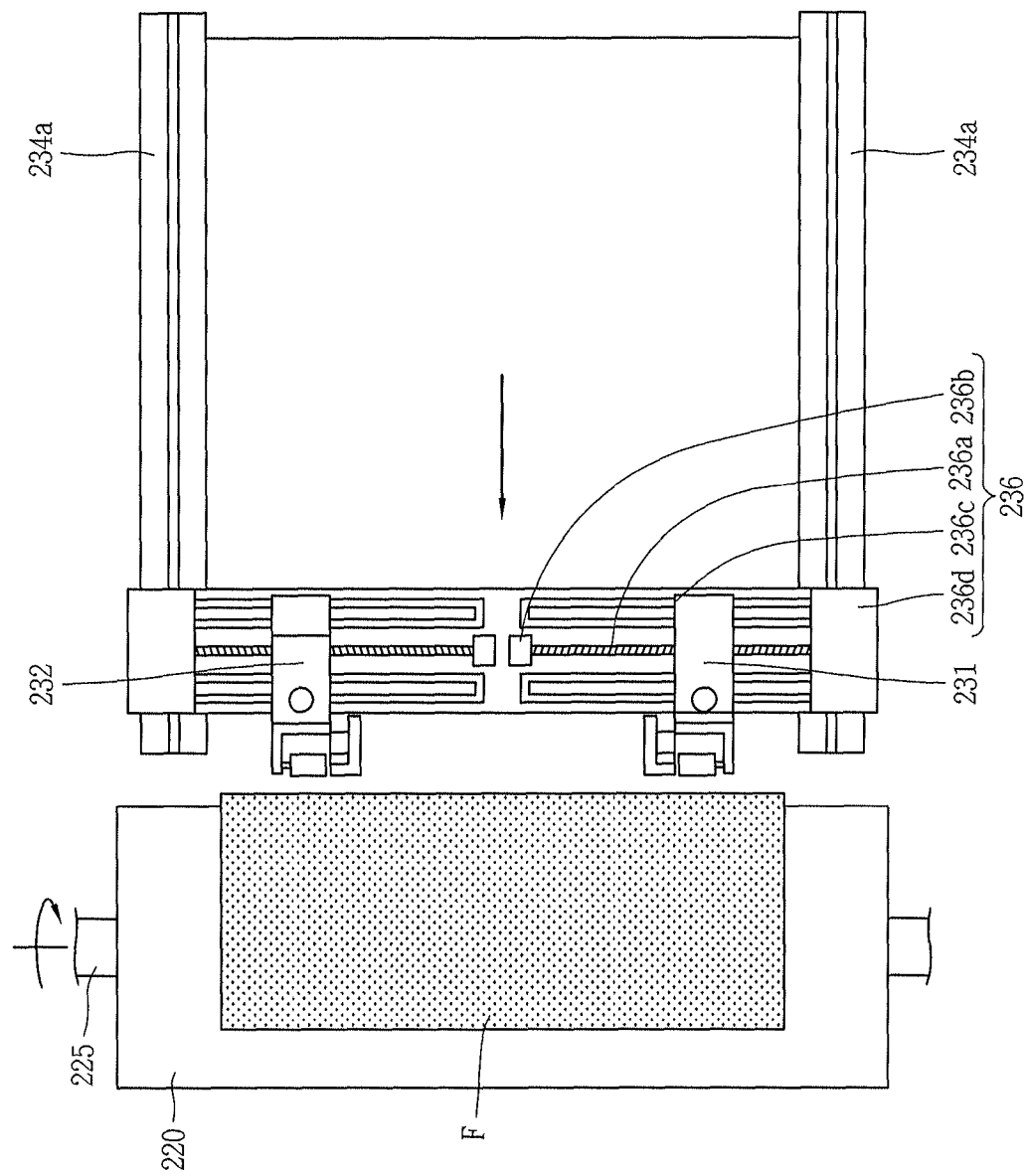

APPARATUS AND METHOD FOR PEELING PROTECTIVE FILM AND METHOD FOR FABRICATING STEREOSCOPIC IMAGE DISPLAY DEVICE

CROSS-REFERENCE TO RELATED APPLICATIONS

The present disclosure relates to subject matter contained in priority Korean Application No. 10-2011-0127171, filed on Nov. 30, 2011, which is herein expressly incorporated by reference in its entirety.

BACKGROUND

1. Field of the Disclosure

Embodiments of the present disclosure relate to an apparatus and method for peeling a protection film and a method for fabricating a stereoscopic image display device, and more particularly, to an apparatus and method for peeling a protective film which can shorten process time and reduce defects in the process of peeling a protective film of a polarizer, and a method for fabricating a stereoscopic image display device.

2. Background

In recent years, display devices as visual information transfer media have gained more importance in the information society. In order to hold an important position in the future, the display devices should be thin and light, offer lower power consumption and provide high image quality.

A liquid crystal display (LCD) device displays an image by using optical anisotropy of a liquid crystal material. In addition, the LCD device has better viewing characteristic and has lower average power consumption and heat generation than CRTs having the same screen size. The LCD devices are drawing great attention as one of the next generation display devices.

In such a liquid crystal display device, picture signals are supplied to a matrix of pixels respectively, for displaying a desired picture by controlling light transmittance of the pixels. For this, the liquid crystal display device is provided with a lower substrate having thin film transistors arranged thereon and an upper substrate having color filters formed thereon bonded together with a liquid crystal layer disposed therebetween. The lower substrate and the upper substrate have polarizers formed on surfaces thereof for controlling blocking or transmission of light depending on a direction of transmission of the light.

A fabrication process for the liquid crystal display device includes a lower substrate forming process, an upper substrate forming process, a cell process for encapsulating liquid crystals, and a module process for attaching and assembling a polarizer, a driving circuit unit, a backlight unit, etc. The polarizer is put into the module process, with a protective film adhered to both surfaces or a single surface of the polarizer through an adhesive film. The adhesive film is provided to attach the polarizer to a display panel. The protective film is for protecting the adhesive film until before the polarizer is attached to the display panel. Accordingly, the polarizer undergoes a protective film peeling process if it to be attached to the display panel.

Hereinafter, the process and apparatus for peeling a protective film according to the related art will be described in detail with reference to the drawings.

FIG. 1 is a top plan view of an apparatus for peeling a protective film according to the related art.

The apparatus for peeling a protective film F may include a flat plate 20 with a polarizer P disposed thereon, vacuum suction holes H formed on the front surface of the flat plate 20, vertical moving units 34 disposed on both sides of the flat plate 20 and including guide rails for guiding Y-directional movement, a horizontal moving unit 33 that moves along the vertical moving units 34, and a peeling unit 30 mounted on the horizontal moving unit 33 and for peeling the protective film F while moving in the x-direction.

Hereinafter, the operation of the apparatus for peeling the protective film F will be explained. First, the polarizer P with the protective film F attached on its front surface is placed on top of the flat plate 20. The polarizer P is vacuum-sucked onto the flat plate 20 by the vacuum suction holes H. A plurality of vacuum suction holes H may be disposed at equal intervals to increase adhesion and make the adhesion uniform.

Next, the peeling unit 30 on the horizontal moving unit 33 starts to peel a surface of the protective film F. The peeling unit 30 may include a clamp 75 and a peeling roller 71. The peeling roller 71 may have adhesive constituents applied on its outer peripheral surface or have an adhesive tape wound around it. The clamp 75 may be disposed at a side portion of the peeling roller 71.

The peeling roller 71 comes into contact with a surface of the protective film F to adhere the protective film F thereon, and then the peeling roller 71 is rotated to wind the surface of the protective film F. Accordingly, the surface of the protective film F is peeled from the polarizer P, and the wound surface of the protective film is held by the clamp 75.

Afterwards, the horizontal moving unit 33 completely peels the protective film F from the polarizer P while moving in the x-direction by means of the vertical moving unit 34. Simultaneously, the peeling unit 30 also moves in the y-direction on the horizontal moving unit 33, and therefore protective film F is peeled in a diagonal direction as indicated by the arrow.

The polarizer P with the protective film peeled proceeds to the next stage to be attached to the display panel, which will be described in more detail with reference to FIG. 2.

FIG. 2 is a block diagram of a method for peeling a protective film and attaching a polarizer according to the related art.

All the stages of this process can be carried out on the flat plate.

A polarizer supply unit 1 is a stage of loading many polarizers each having a protective film attached thereon. A polarizer is transferred from the polarizer supply unit 1 to the protective film peeling unit 2 by means of a first robot arm 11. Next, a peeling process as explained in FIG. 1 is performed in the protective film peeling unit 2. Afterwards, the polarizer with the protective film peeled is transferred to a polarizer attachment unit 4 by means of a second robot arm 12 or moving means (not shown). At this point, a display panel is transferred from a display panel supply unit 3 to the polarizer attachment unit 4 by means of a third robot arm 13 or moving means (not shown). The polarizer attachment unit 4 is adapted to attach the polarizer on the bottom once the display panel is transported and aligned at a fixed position. The surface of the protective film from which the protective film is peeled is attached to the display panel. Subsequently, the display panel with the polarizer attached thereon is moved to a backlight unit and circuit assembly unit 5, where a backlight unit is assembled under the display panel and a driving circuit is connected by means of a flexible film.

As explained above, the process of peeling the protective film and attaching the polarizer is sequentially carried out at time intervals since there should be no interference between the stages and the robot arms and moving means for connecting between the stages. Moreover, the stages do not overlap each other because each process is carried out on the flat plate, thus leading to an increase in equipment layout area. In addition, a complicated driving apparatus is included to connect between the stages, thus making maintenance and management not easy.

SUMMARY

An apparatus for peeling a protective film includes: a cylindrical plate for rotating a film member attached to the outer peripheral surface thereof, the film member having a protective film attached to the front surface thereof; a peeling unit comprising a peeling roller disposed at a side portion of the cylindrical plate to peel the protective film from the film member and a clamp for holding the peeled portion of the protective film; and a first moving unit for moving the peeling unit backward from the cylindrical plate to peel the protective film, wherein the peeling unit is moved along an axial direction of the cylindrical plate so that the peeling unit is contacted to the a different position of the protection film for each peeling process.

Furthermore, a method for peeling a protective may include: attaching a film member having a protective film to the outer peripheral surface of a cylindrical plate; rotating the film member by rotating the cylindrical plate; peeling the protective film by adhering a peeling roller of a peeling unit to the surface of the protective film and rotating the peeling roller; holding the peeled portion of the protective film by a clamp of the peeling unit; peeling the protective film by moving the peeling unit backward; and moving the peeling unit along an axial direction of the cylindrical plate in a uniform interval from the outer peripheral surface of the cylindrical plate so that the peeling roller is contacted to the a different position of the protection film for each peeling process.

In this invention, a film member attached to the outer peripheral surface of a cylindrical plate is peeled by peeling units. The peeling unit includes a peeling roller disposed at a side portion of the cylindrical plate to peel the film member and a clamp for holding the peeled portion of the protective film. The peeling unit is moving in the opposing direction of the cylindrical plate by a first moving unit and along an axial direction of the cylindrical plate. At this time, the intervals between each of the peeling units and the outer peripheral surface of the cylindrical plate are same so that the contact portions of the peeling rollers are variable.

BRIEF DESCRIPTION OF THE DRAWINGS

The intervals between the peeling units and the outer peripheral surface of the cylindrical plate being same so that contact portions of the peeling rollers are variable. The peeling unit includes a first peeling unit and a second peeling unit disposed on the same line of a side portion of the cylindrical plate, the first peeling unit and the second peeling unit being spaced apart from each other, the first peeling unit and the second peeling unit are linearly moved between the first peeling unit and the second peeling unit.

In the drawings:

FIGS. 9A to 9F are top plan views of the operation of the apparatus for peeling a protective film according to the second embodiment of the present invention;

DETAILED DESCRIPTION OF THE EXEMPLARY EMBODIMENTS

Figure 1:
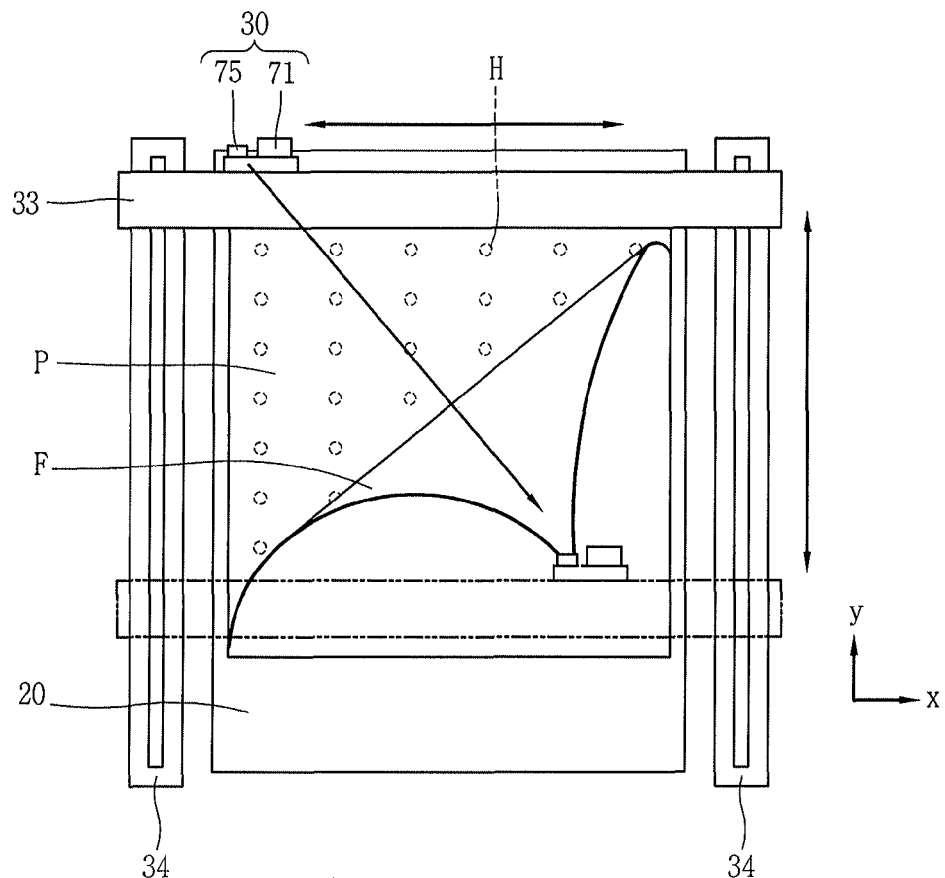
FIG. 1 is a top plan view of an apparatus for peeling a protective film according to the related art.
Figure 2:
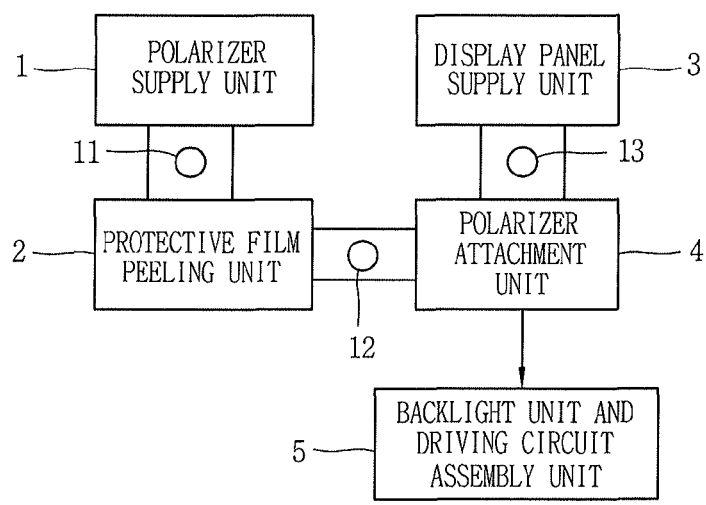
FIG. 2 is a block diagram of a method for peeling a protective film and attaching a polarizer according to the related art.

Hereinafter, an apparatus and method for peeling a protective film and a method for fabricating a stereoscopic image display device according to an embodiment of the present invention will be described in more detail with reference to the drawings.

This specification employs same or similar reference numerals for same or similar components irrespective of different embodiments, and descriptions thereof will not be repeated.

The expression in the singular form in this specification will be interchangeable with the expression in the plural form unless otherwise indicated obviously from the context.

In the embodiments of the present invention, an object with a protective film attached on its front surface is a film member, and an aspect of the embodiments of the present invention is to peel the protective film from the film member. Here, the film member may be a polarizer or the like that changes the properties of light, and the following description will be made with respect to the polarizer.

FIGS. 3A to 3F are schematic cross-sectional views of a method for fabricating a display device according to a first embodiment of the present invention.

In the method for fabricating a display device according to the first embodiment of the present invention, the display device is fabricated by including a polarizer supply unit 101, a polarizer fixing unit 101*a*, a protective film peeling unit 102, a display panel supply unit 103, a polarizer attachment unit 104, and a module assembly unit 105.

Figure 3A:
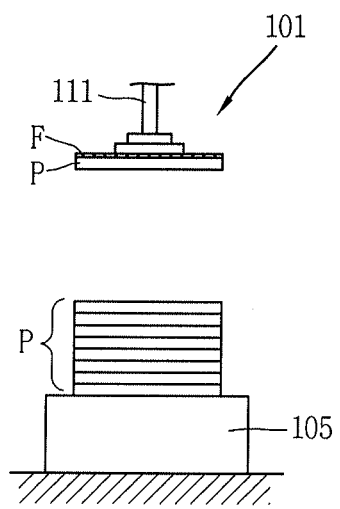
FIG. 3A to FIG. 3F show schematic cross-sectional views of a method for fabricating a display device according to a first embodiment of the present invention.

First, referring to FIG. 3A, the polarizer supply unit 101 loads a plurality of polarizers P on top of a work table 105. The plurality of polarizers P each have a protective film F attached on their both surfaces. The protective film F attached on the front surface is provided to allow the polarizer P to protect an adhesive film (not shown) applied to be attached to a display panel D, and the protective film F attached on the rear surface is provided to prevent damage on the polarizer P and avoid insertion of impurities. The protective film F on the front surface may be referred to as a release film. In the drawings, only the protective film F for protecting the adhesive film (not shown) is depicted.

The polarizers P are lifted and transported one by one by a transfer robot 111 positioned above them, and transferred to the polarizer fixing unit 101a.

Figure 3B:
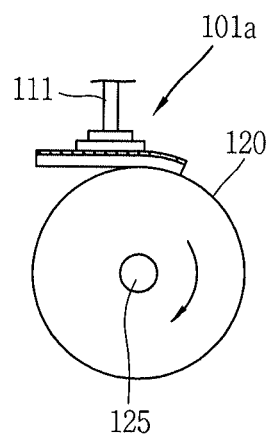

In FIG. 3B, the polarizer fixing unit 101a, positioned above a cylindrical plate 120, attaches and fixes the polarizer P on the outer peripheral surface of the cylindrical plate 120.

The cylindrical plate 120 is rotated on a rotation shaft 125, and its outer peripheral surface is applied with an adhesive pad (not shown) to fix the polarizer P thereto. The adhesive pad (not shown) may be a micro pad, and any material capable of attaching the polarizer P can be used as the adhesive pad (not shown).

The transfer robot 111 transfers the polarizer P so that the rear surface of the polarizer P is brought into contact with an upper part of the outer peripheral surface of the cylindrical plate 120. One area of the polarizer P is brought into contact with the outer peripheral surface, and the entire area of the rear surface of the polarizer P is attached to the outer peripheral surface of the cylindrical plate 120 by the rotation of the cylindrical plate 120. Afterwards, the polarizer P is moved with the rotation of the cylindrical plate 120, and becomes close to the protective film peeling unit 102.

Figure 3C:
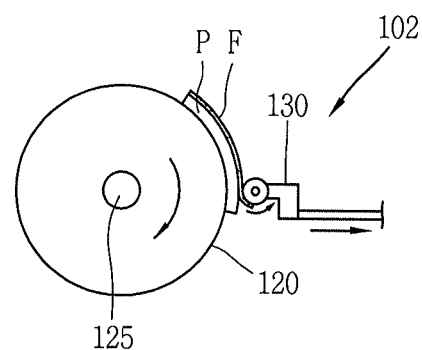

Referring to FIG. 3C, the protective film peeling unit 102 is disposed at a side portion of the cylindrical plate 120, and includes a peeling unit 130.

The peeling unit 130 peels and fixes an edge surface of the protective film F through a roller (not shown) and a clamp (not shown). As the peeling unit 130 is moved backward and away from the cylindrical plate, it pulls the protective film F and thus completely peels the protective film F.

The polarizer P is moved to the polarizer attachment unit as the cylindrical plate 120 is rotated.

The polarizer attachment unit attaches the polarizer P onto the front surface of the display panel D transported from the display panel supply unit 103.

Figure 3D:
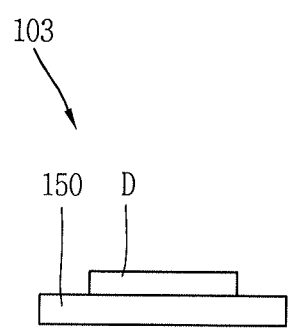

Referring to FIG. 3D, the display panel supply unit 103 is disposed below the protective film peeling unit 102, and loads a display panel D on top of a work substrate 150 and supplies the display panel D under the cylindrical plate 120 by means of a transfer robot (not shown) or roller (not shown). The display panel being transported is a display panel D that undergoes a cell process, i.e., all of a lower substrate forming process, an upper substrate forming process, and an upper and lower substrate encapsulation process. For example, the display panel D may have a thin film transistor substrate and a color filter substrate formed thereon and liquid crystals encapsulated between them.

Figure 3E:
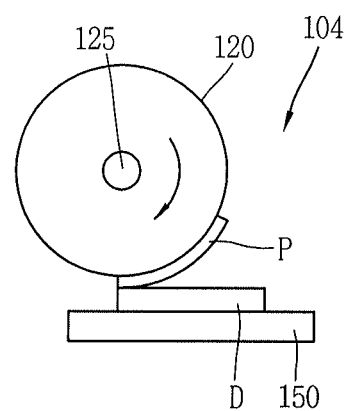

Referring to FIG. 3E, the work substrate 150 moves the display panel D so that the front surface of the display panel D and the front surface (from which the protective film F is peeled) are in contact with each other and an edge of the polarizer P and an edge of the display panel D engage with each other. The front surface of the polarizer P can be attached onto the front surface of the display panel D because it completely preserves the adhesive film.

Figure 3F:
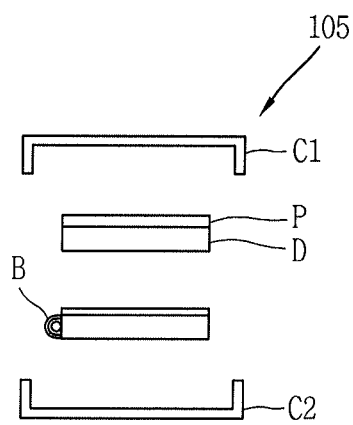

Referring to FIG. 3F, the display panel D continues to be moved and inserted into the module assembly unit 105, and a backlight unit B is assembled under the display panel D on a given stage, a driving circuit unit is connected to a surface of the display panel D, and a top cover C1 and a bottom cover C2 are fastened together, thereby completing a display device.

In the above-described fabrication of a display device, the processes are carried out on top, side, and bottom portions of the cylindrical plate 120, and therefore there may be an overlap in direction of movement position between each process step, thus making it possible to carry out the processes in a narrow space. Accordingly, process equipment can be simplified, and process time can be shortened.

In the polarizer attachment unit 104, in the related art, the polarizer P is fixed by a vacuum suction method and then released from vacuum suction immediately before the polarizer P is attached to the display panel D. Hereupon, the polarizer P is often moved at the instant the vacuum suction is released, which leads to a misalignment. Meanwhile, in the first embodiment of the present invention, the polarizer P can be adhered by the adhesive pad on the surface of the cylindrical plate 120 until the polarizer P is fully attached to the display panel D, thereby precisely attaching the polarizer P. This offers a big advantage in the fabrication of a device, such as a 3D display device, that requires precise attachment of a pattern retarder.

The peeling process is carried out on the polarizer P attached to the cylindrical plate 120, so a separate stage for fixing the polarizer P is unnecessary I the peeling process.

The process for peeling the protective film F of the polarizer P will be described in detail with reference to the drawings.

Figure 4:
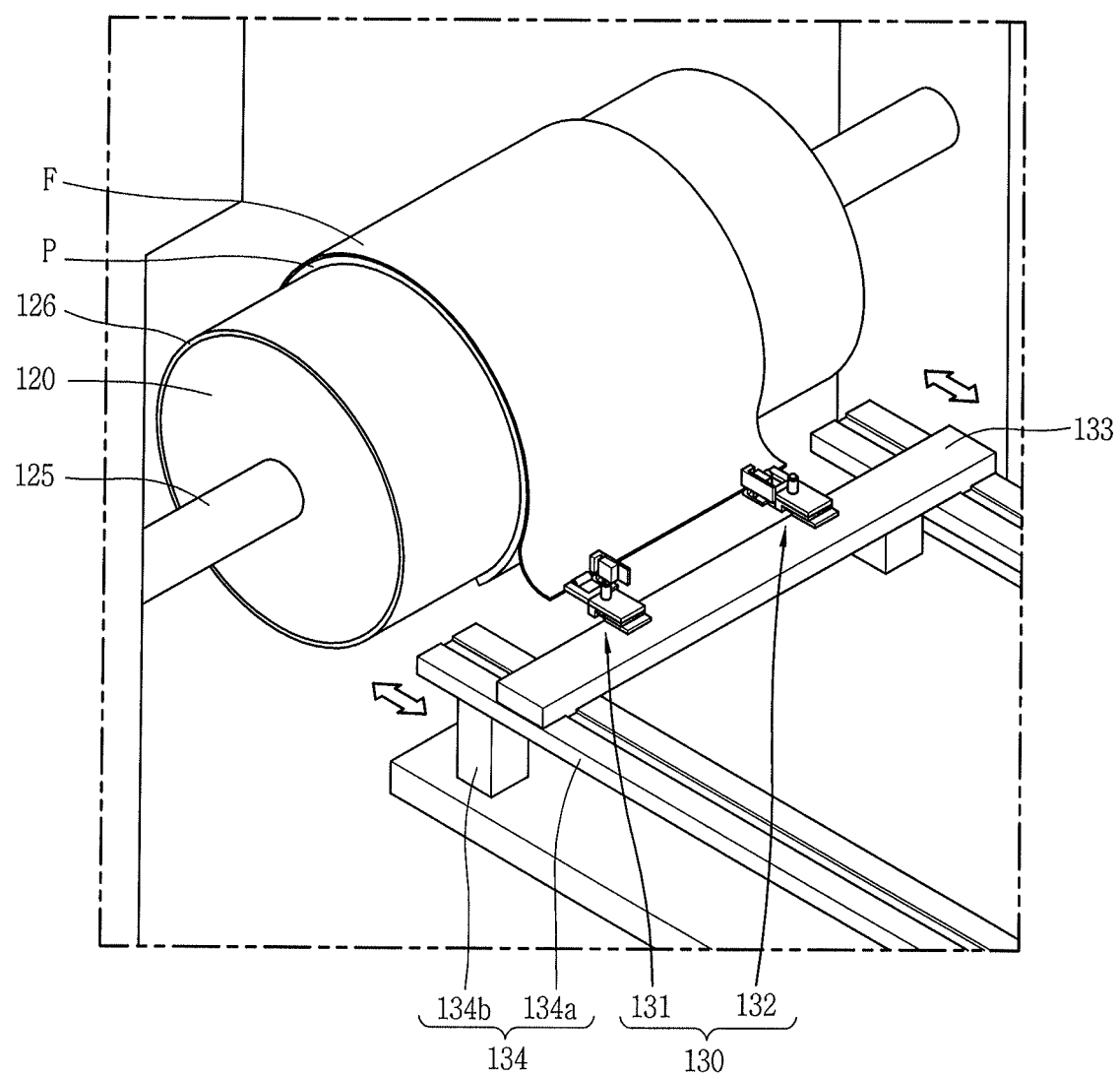
FIG. 4 is a perspective view of an apparatus for peeling a protective film according to the first embodiment of the present invention.
Figure 5:
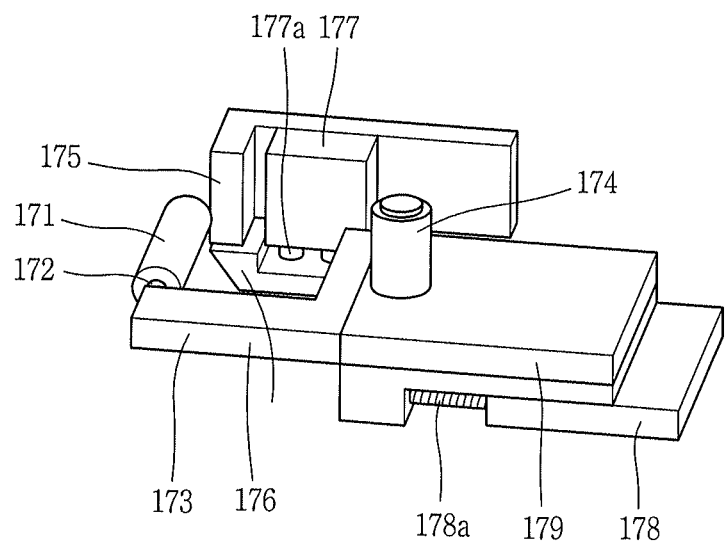
FIG. 5 is a perspective view of a peeling unit according to the first embodiment of the present invention.

FIG. 4 is a perspective view of an apparatus for peeling a protective film according to the first embodiment of the present invention. FIG. 5 is a perspective view of a peeling unit according to the first embodiment of the present invention. FIGS. 6a to 6d are cross-sectional views of a peeling operation of the peeling unit according to the first embodiment of the present invention.

The apparatus for peeling the protective film F according to the first embodiment of the present invention may largely include a cylindrical plate 120, a peeling unit 130, a peeling unit fixing unit 133, and a peeling unit moving unit 134.

The cylindrical plate 120 may be formed in the shape of a cylindrical drum, and is rotatably driven on a rotation shaft 125 penetrating the center of the cylindrical plate 120. The rotation shaft 125 is supported by a rotation shaft support (not shown), and may be rotated by a servo motor (not shown). A thin adhesive pad 126 may be applied to the outer peripheral surface of the cylindrical plate 120 to attach the polarizer P thereon.

The peeling unit 130 is disposed at a side portion of the cylindrical plate 120 to peel the protective film F of the polarizer P. The peeling unit 130 may include a first peeling unit 131 and a second peeling unit 132. The first and second peeling units 131 and 132 are spaced a predetermined distance apart from each other, and are disposed so that they are spaced an equal distance apart from the outer peripheral surface of the cylindrical plate 120. If there are a plurality of peeling units 130, they apply uniform force to edge areas of the protective film F when peeling the protective film F, thereby performing more stable peeling. This lessens the risk of hanging the peeled protective film F down and affecting the adhesive pad 126 of the cylindrical plate 126. Accordingly, a plurality of peeling units 130, as well as two peeling units 130, may be disposed.

The first and second peeling units 131 and 132 are areas where the protective film F can be peeled, and function to peel and hold an edge surface of the protective film F upon rotation, as shown in FIG. 4.

The peeling unit fixing unit 133 functions to fix the first and second peeling units 131 and 132. The peeling unit fixing unit 133 may be disposed in parallel with the rotation shaft 125 so that the first and second peeling units 131 and 132 are spaced apart from the cylindrical plate 120 by an equal distance.

The peeling unit moving unit 134 functions to move the peeling unit fixing unit 133 forward and backward. The peeling unit moving unit 134 may include a guide rail 134 for guiding the movement of the peeling unit fixing unit 133, a support unit 134b for supporting the guide rail 134a, and a protective film moving unit (not shown) for moving the peeled protective film F to a protective film collecting unit (not shown).

An operation of the peeling unit moving unit 134 will be described. When the peeling unit 130 peels and holds an edge surface of the protective film F, the peeling unit moving unit 134 moves the peeling unit 130 backward from the cylindrical plate 120. At this point, the protective film F is completely peeled from the polarizer P as it is pulled. The peeling unit 130 releases the holding of the peeled protective film F, and then the peeling unit moving unit 134 moves the peeling unit 130 forward again to prepare for the peeling of the next polarizer P. In the drawing, the direction of the arrows indicate the movement direction of the peeling unit moving unit 134.

Referring to FIG. 5, the peeling unit 130 largely includes a peeing roller 171 for peeling the protective film F, upper and lower clamps 175 and 176 for holding the protective film F, and a main body 179 to which the peeling roller 171 and the upper and lower clamps 175 and 176 are fixed.

More specifically, the peeling roller 171 has an adhesive tape wound on its outer peripheral surface or an adhesive material applied thereto, to adhere the protective film F thereon. The peeling roller 171 protrudes forward from the main body 179, and the peeling roller 171, adhered to the protective film F by the rotation of the cylindrical plate 120, is rotated on a roller rotation shaft 172, whereby the protective film F is wound around the outer peripheral surface of the peeling roller 171, thereby peeling the protective film F. The peeling roller 171 and the roller rotation shaft 172 may be fixed to the main body 179 by a fixing member 174, such as a screw.

The upper and lower clamps 175 and 176 are for holding the protective film F. The upper clamp 175 is connected to a first cylinder 177 and fixed to the main body 179, and the lower clamp 176 is connected to the first cylinder 177 by a first moving shaft 177a and disposed to be movable upward and downward. The first cylinder 177 allows the first moving shaft 177a to be moved upward and downward by moving a piston (not shown) inside it with a pneumatic pressure or air pressure. Accordingly, the lower clamp 176 connected to the first moving shaft 177a is moved upward and downward; especially, when the protective film F is peeled by the peeling roller 171 and inserted between the upper clamp 175 and the lower clamp 176, the lower clamp 176 is moved upward to hold the protective film F.

A second cylinder 178 is disposed under the main body 179. The second cylinder 178 is fixed to a surface of the peeling unit fixing unit 133. If the protective film F is positioned close to the peeling unit 130, the second cylinder 178 causes the main body 179 to move forward through a second moving shaft 178a, thereby bringing the peeling roller 171 into contact with the protective film F.

Hereinafter, an operation of the peeling unit 130 will be described below with reference to FIGS. 6A to 6D.

Figure 6A:
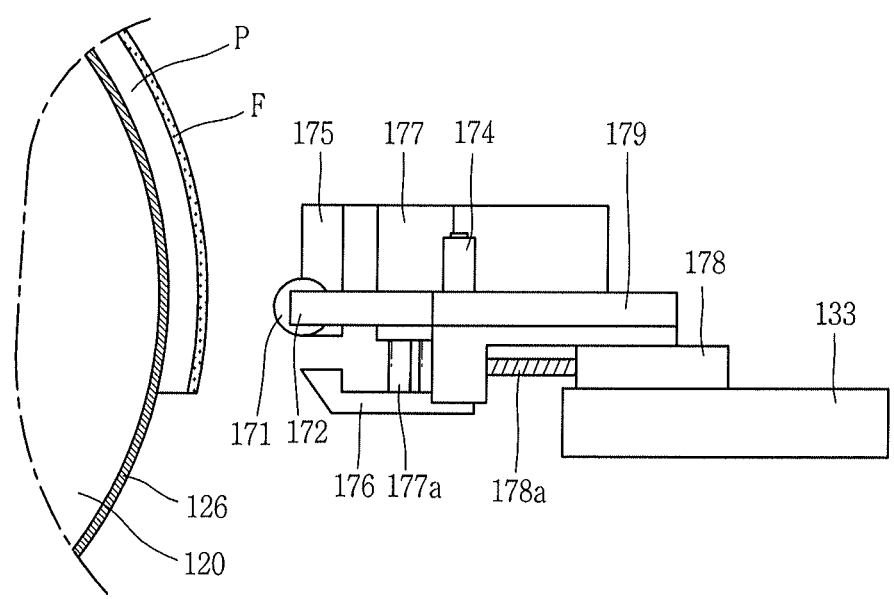
FIGS. 6A to 6D are cross-sectional views of a peeling operation of the peeling unit according to the first embodiment of the present invention.

In FIG. 6A, first of all, the peeling unit 130 is spaced a predetermined distance apart from the cylindrical plate 120 to prepare for a peeling process. The peeling unit 130 is mounted on the peeling unit fixing unit 133, and kept spaced a predetermined distance apart from the cylindrical plate 120 until a surface of the protective film F is rotated to near the peeling roller 171.

Figure 6B:
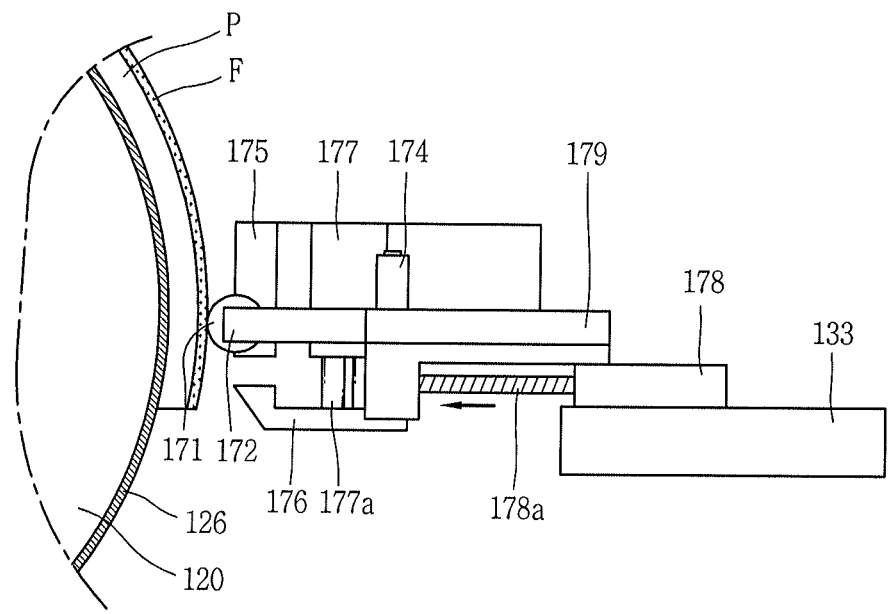

As shown in FIG. 6B, if the protective film F reaches a predetermined position, the second moving shaft 178a is moved by the second cylinder 178 to make the main body 179 of the peeling unit 130 move forward in the direction of the arrow. By the forward movement, a surface of the peeling roller 171 is brought into contact with an edge surface of the protective film F. At this point, the peeling roller 171 may cause the edge surface of the protective film F to be adhered to the surface of the peeling roller 171.

Figure 6C:
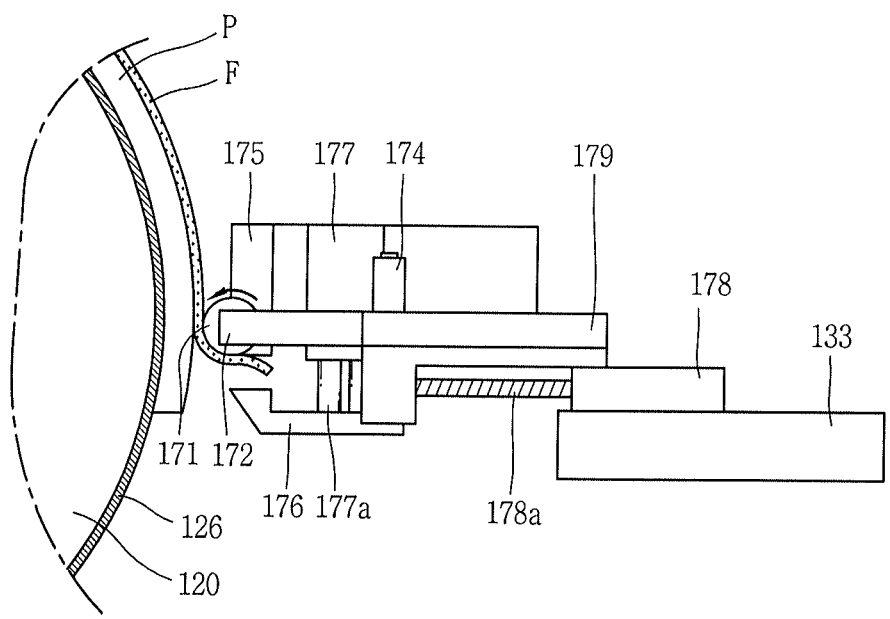

Afterwards, as shown in FIG. 6C, the peeling roller 171 may be rotated in the direction of the arrow on the roller rotation shaft 172 as the cylindrical plate 120 is rotated. By the rotation of the peeling roller 171, the edge surface of the protective film F is attached and wound on the outer peripheral surface of the roller. The wound protective film F is rolled between the upper clamp 175 and the lower clamp 176. The edge surface of the protective film F wound on the peeling roller 171 is peeled from the polarizer P.

Figure 6D:
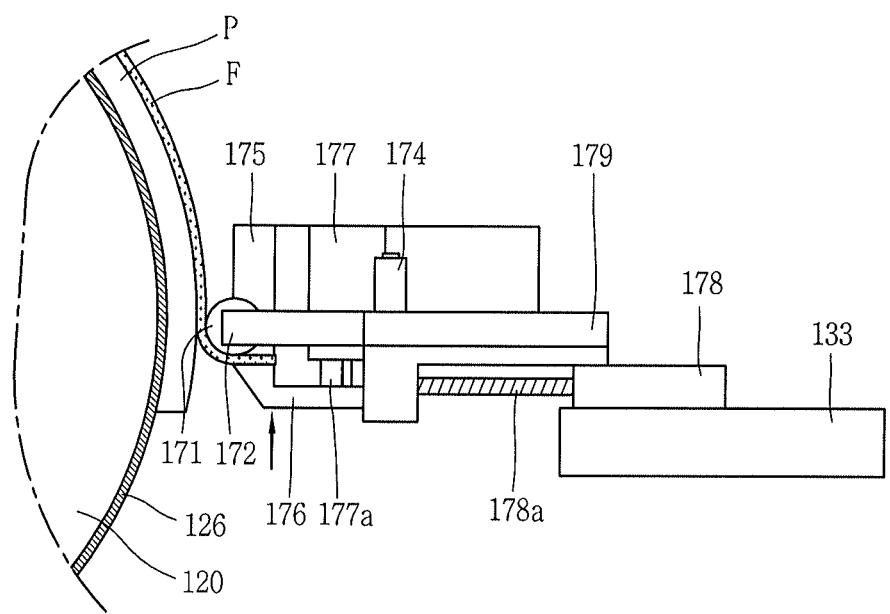

Subsequently, as shown in FIG. 6D, the lower clamp 176 is moved upward by the operation of the first cylinder 177, and the clamps 175 and 176 hold the protective film F inserted between the upper clamp 175 and the lower clamp 176.

Meanwhile, referring to FIG. 6b, the peeling roller 171 comes into contact with a surface of the protective film F in the peeling process. Although the protective film F and the polarizer P are illustrated as thick in the drawing, the protective film F and the polarizer P are thin films which are difficult to detect with naked eyes. Accordingly, the protective film F is pressed by a predetermined pressure when the peeling roller 171 comes into contact with the protective film F, and the adhesive pad 126 on the rear surface of the polarizer P is also pressed.

The adhesive pad 126 is made of a soft material, and may be easily damaged by external pressure and impact. The peeling roller 171 of the peeling unit 130 is brought into contact with the adhesive pad 126 at the same position for every peeling process. Thus, the adhesion force of the adhesive pad 126 may be degraded after a long period of the peeling process.

If the adhesion force of the adhesive pad 126 is degraded, a surface of the polarizer P may be detached from the adhesive pad 126 in the peeling process, and air bubbles may be generated between the polarizer P and the display panel in the process of attaching the polarizer P.

Therefore, a second embodiment of the present invention is characterized in that the peeling unit 130 does not remain at one position but the peeling process is carried out at different positions.

Hereinafter, the second embodiment of the present invention will be concretely described.

Figure 7:
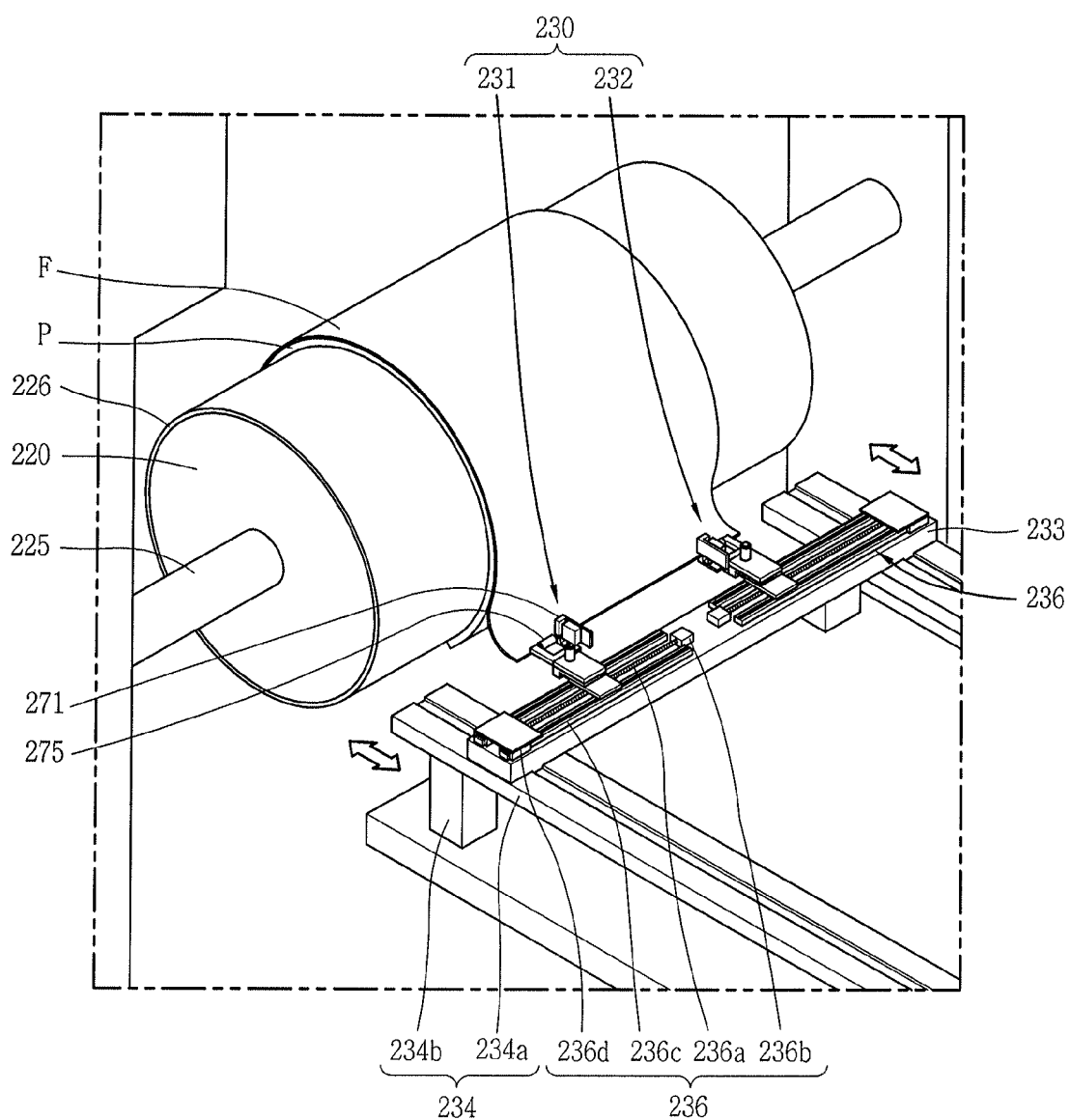
FIG. 7 is a perspective view of an apparatus for peeling a protective film according to a second embodiment of the present invention.

FIG. 7 is a perspective view of an apparatus for peeling a protective film according to a second embodiment of the present invention.

The apparatus for peeling a protective film F according to the second embodiment of the present invention may largely include a cylindrical plate 220, a peeling unit 230, a first moving unit 234, and a second moving unit 236. The cylindrical plate 220, the peeling unit 230, and the first moving unit 234 may have the same structure as the cylindrical plate, peeling unit, and peeling unit moving unit of the first embodiment.

The cylindrical plate 220 may be rotated at the same position on a rotation shaft 225 formed at the center. Also, an adhesive pad 226 for attaching a polarizer P may be applied on the outer peripheral surface of the cylindrical plate 220.

The peeling unit 230 may consist of a first peeling unit 231 and a second peeling unit 232, and include a peeling roller 271, an upper clamp 275, a lower clamp (not shown), a first cylinder (not shown), and a second cylinder (not shown). The peeling roller 271, being adhered to the protective film F, is rotated to peel a surface of the protective film F, the upper clamp 275 and the lower clamp (not shown) hold the protective film F, the first cylinder (not shown) move the lower clamp (not shown) upward and downward to assist the holding of the protective film F, and the second cylinder (not shown) moves the peeling roller 271 and the clamps (not shown) forward and backward to bring them into contact with the protective film F.

The first moving unit 234 consists of a support unit 234b and a first guide rail 234a. If the peeling unit 230 is holding a surface of the protective film F, it moves the peeling unit 230 backward from the cylindrical plate 220 and completely peels the protective film F. Then, the peeling unit 230 may be moved back forward and placed at the original position.

The second moving unit 236 may consist of a ball screw 236a, a servo motor 236d, a second guide rail 236c, and a screw rotation stopper 236b, which are not present in the first embodiment.

The second moving unit 236 is disposed under the first peeling unit 231 and the second peeling unit 232, which are placed above the stopper 233, and moves the first and second peeling units 231 and 232. The movement direction may be a left or right direction. The left or right direction may be a direction parallel with the rotation shaft 225 of the cylindrical plate 220, and may be a direction in which the peeling unit 230 is moved while maintaining a predetermined distance from the outer peripheral surface of the cylindrical plate 220.

The second moving unit 236 of this type proceeds to the next peeling process after moving the position of the peeling unit 230 each time a peeling process is finished, so that the position where the peeling unit 230 peels the protective film F can be changed.

That is, it is possible to prevent the peeling roller 271 of the peeling unit 230 from coming into contact with the protective film F at the same position for each peeling process. Accordingly, the peeling roller 271 comes into contact with the adhesive pad 226 at a different position for each peeling process, thereby preventing damage to the adhesive pad 226 which may occur when the peeling roller 271 continuously comes into contact with only one position. Therefore, the adhesion force of the adhesion pad 226 is continuously maintained, and air bubbles, which may be generated when the polarizer P is attached to the display panel, can be removed.

When comparing the related art and the second embodiment, regarding the air bubble defect rate of the polarizer P in the case of the production of 1 million products, 164 defective products were produced in the related art, whereas 21 defective products were produced according to the second embodiment of the present invention. As a result, the defect rate can be lowered by about 87% compared to the related art.

A configuration of the second moving unit 236 will be described in more detail with reference to FIG. 8.

Figure 8:
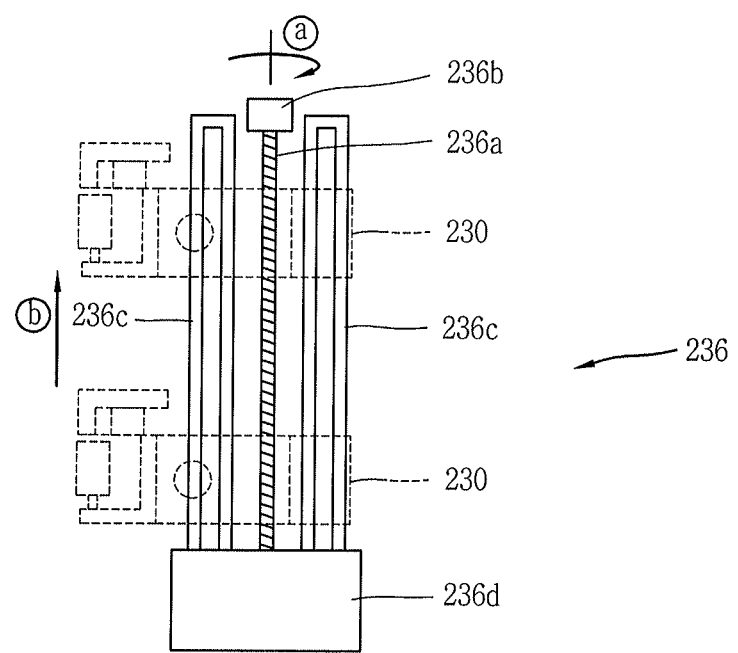
FIG. 8 is a top plan view of a second moving unit according to the second embodiment of the present invention.

FIG. 8 is a top plan view of a second moving unit according to the second embodiment of the present invention.

The second moving unit 236 may consist of a ball screw 236a, a screw rotation stopper 236b, a second guide rail 236c, and a servo motor 236d.

The ball screw 236a may be disposed in contact with the bottom surface of the peeling unit 230 and have spiral grooves formed on the outer surface of the bar. The alignment direction of the spiral grooves of the ball screw 236a may be a diagonal direction. The servo motor 236d is a component for rotating the ball screw 236a, and may be disposed at one end of the ball screw 236a. The second guide rail 236c includes rails which are disposed at both sides of the ball screw 236a and move the peeling unit 230, and guides the movement of the peeling unit 230. The screw rotation stopper 236b functions to prevent the rotation shaft 225 of the ball screw 236a from being moved while the ball screw 236a is rotated by the servo motor 236d.

Hereinafter, the operation of the second moving unit 236 will be described below.

The servo motor 236d may rotate the ball screw 236a in the direction of ⓐ. At this point, the ball screw 236a may change a rotational movement into a linear movement by means of the shape of the spiral grooves. That is, while the ball screw 236a is rotated at the same position, the peeling unit 230 being in contact with the ball screw 236a may be linearly moved in one direction by the rotation of the ball screw 236a.

In the drawing, if the ball screw 236a is rotated in the direction of ⓐ, i.e., in a clockwise direction, the peeling unit 230 may be moved in the direction of ⓑ. If the ball screw 236a is rotated in the opposite direction of the direction of ⓐ, i.e., in a counterclockwise direction, the peeling unit 230 may be moved in the opposite direction of the direction of ⓑ. Accordingly, the ball screw 236a can reciprocate the peeling unit 230 by adjusting the rotation direction.

Hereinafter, an apparatus and method for peeling a protective film according to the second embodiment of the present invention will be described in detail with reference to other drawings.

FIGS. 9A to 9F are top plan views of the operation of the apparatus for peeling a protective film F according to the second embodiment of the present invention. FIG. 10 is a sequential chart of the method for peeling a protective film F according to the second embodiment of the present invention.

First, a polarizer P with a protective film F attached to its front surface is transferred to the cylindrical plate 220 (S1). The polarizer P may be transferred one by one from a polarizer loading portion by means of a robot arm.

Next, the transferred polarizer P, which is placed on the cylindrical plate 220, is attached to the outer peripheral surface of the cylindrical plate 220 (S2). The outer peripheral surface of the cylindrical plate 220 may be applied with an adhesive pad to adhere the rear surface of the polarizer P to it.

As shown in FIG. 9A, the polarizer P is provided at a position where the cylindrical plate 220 to rotates the polarizer P to cause the peeling unit 230 to peel the protective film F. The cylindrical plate 220 is rotated on a rotational shaft 225, as indicated by the arrow direction, and the first and second peeling units 231 and 232, fixed on top of the second moving unit 236, are disposed at a side portion of the cylindrical plate 220. The first and second peeling units 231 and 232 are spaced an equal distance apart from the outer peripheral surface of the cylindrical plate 220 and maintain the same distance from the outer peripheral surface of the cylindrical plate 220. In the drawing, the initial positions of the first and second peeling units 231 and 232 correspond to left and right edges of the protective film F; however, they may correspond to any areas where the peeling roller 271 can come into contact with the protective film F.

Subsequently, as shown in FIG. 9B, the first and second peeling units 231 and 232 peel a surface of the protective film F (S3). As shown in FIGS. 6a to 6c, a process for the first and second peeling units 231 and 232 to peel a surface of the protective film F can be carried out in such a manner that the peeling roller 271 is rotated in contact with a surface or an edge surface of the protective film F to wind and peel the protective film F.

Next, the peeled surface of the protective film F may be held by an upper clamp (not shown) and a lower clamp (not shown) which are disposed in parallel with the peeling roller (not shown) (S4). As shown in FIG. 6d, the lower clamp (not shown) is moved upward by the first cylinder (not shown) to insert the protective film F between the upper clamp (not shown) and the lower clamp (not shown), thereby holding the peeled surface of the protective film F.

Figure 9C:
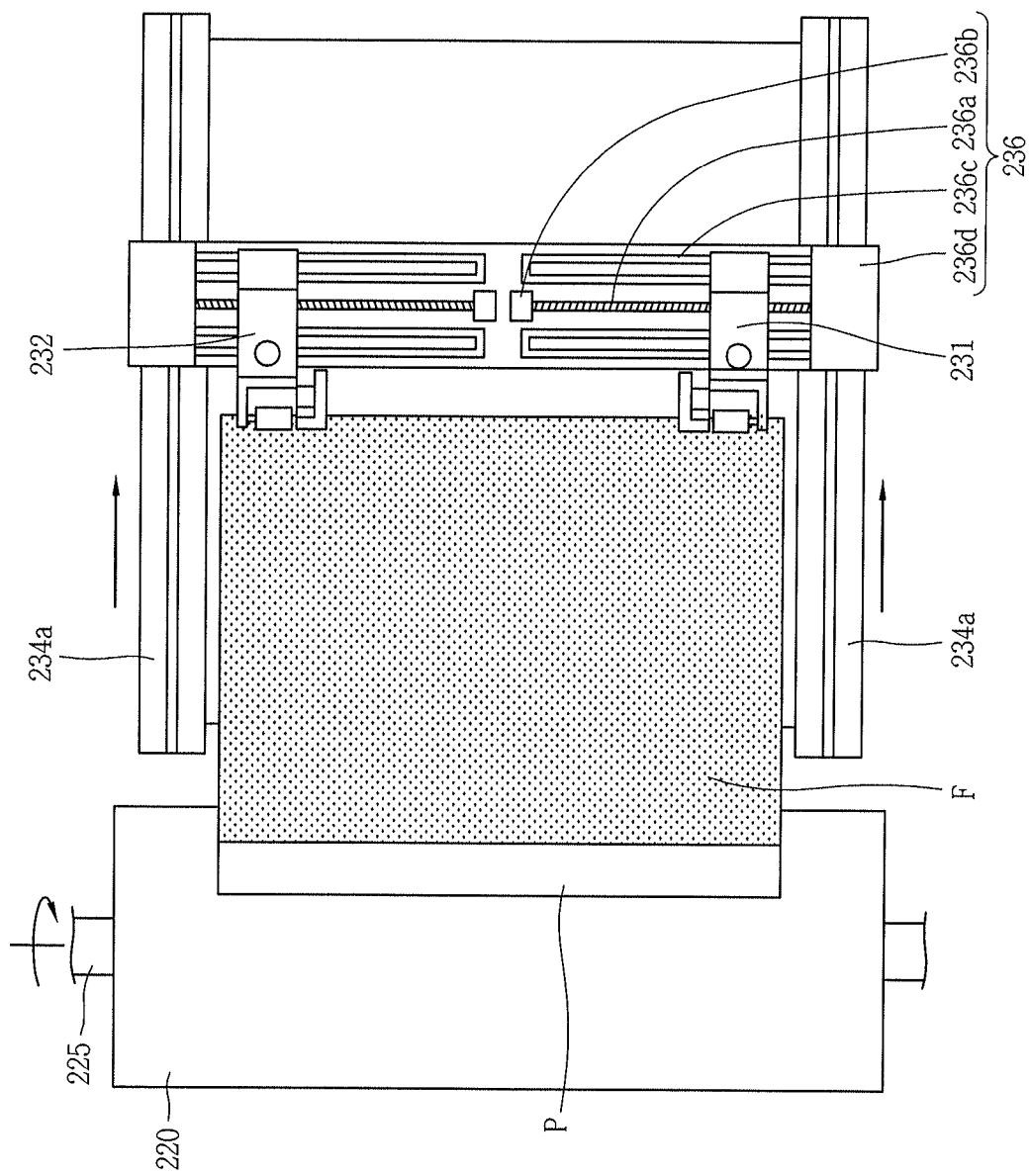
Figure 10:
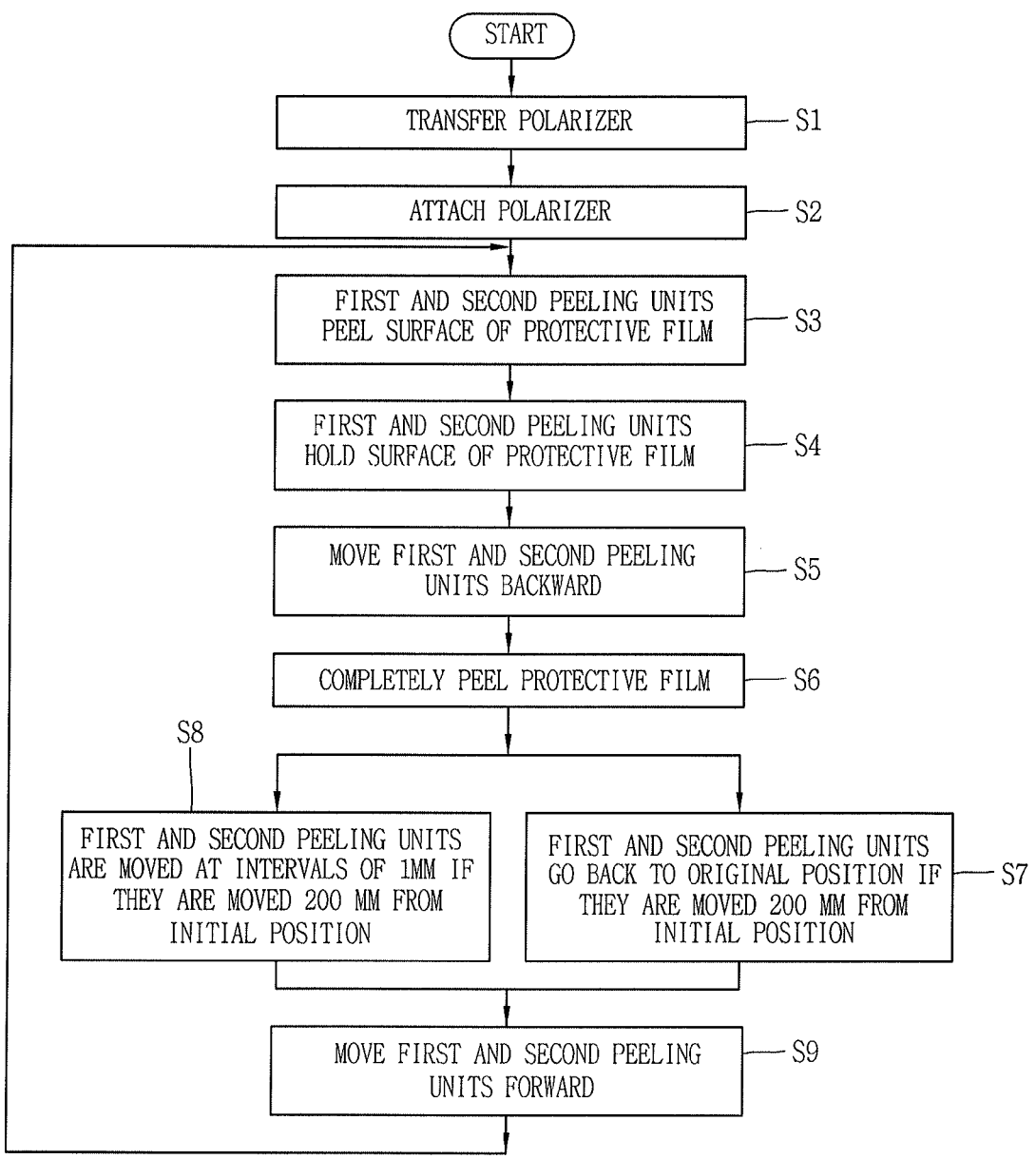
FIG. 10 is a sequential chart of the method for peeling a protective film according to the second embodiment of the present invention.

Afterwards, as shown in FIG. 9C, the first and second peeling units 231 and 232 may be moved backward (S5). At this point, the first moving unit 234 moves the second moving unit 236 backward. Since the first and second peeling units 231 and 232 are mounted on the second moving unit 236, the peeling unit 230 is moved backward. The second moving unit 236 may be moved along the guide rail 234a of the first moving unit 234 because moving means, such as wheels, is installed on the bottom of both sides of the second moving unit 236.

The protective film F is pulled by moving the first and second peeling units 231 and 232. Thus, if the peeling unit 230 is moved at a predetermined distance, the protective film F can be completely peeled from the polarizer P (S6). Accordingly, only the polarizer P remains attached to the cylindrical plate 220.

Subsequently, as shown in FIG. 9D, the peeled protective film F is fed backward by the movement of a protective film moving unit (not shown) disposed at the center of the first moving unit 234. The peeled protective film F may be transferred to a protective film collecting unit (not shown).

Here, the peeling unit 230 may be moved by a predetermined distance on the second moving unit 236. The first and second peeling units 231 and 232 are moved by an equal distance in a direction in which they face each other; they may be moved at intervals of about 1 mm. In the drawing, the dotted line denotes the position of the peeling unit 230 before movement, and the arrow direction denotes the movement direction of the peeling unit 230 (S7).

Afterwards, as shown in FIG. 9E, the second moving unit 236 may be moved forward by the first moving unit 234 and go back to the original position (S9). Subsequently, the same peeling process is performed on the next polarizer P which is to be attached to the cylindrical plate 220 and rotated.

Figure 9F:
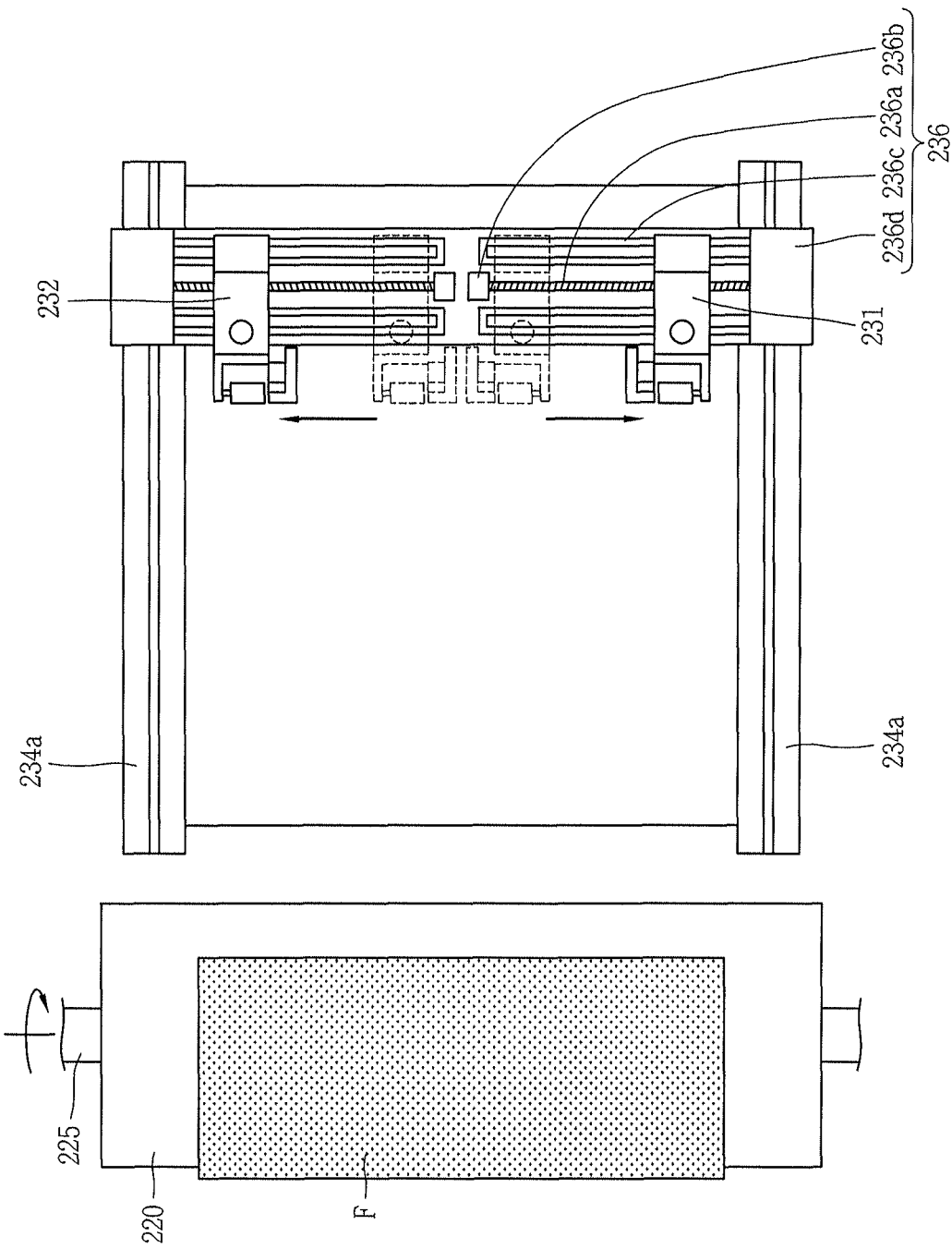

As shown in FIG. 9F, if the first and second peeling units 231 and 232 reach their limit where they cannot be moved any further, while being moved at intervals of 1 mm, they can go back to the initial position (S8). The limit where they cannot be moved any further may be a point spaced about 200 mm from the initial position. That is, when the peeling unit 230 is repeatedly moved at the interval of 1 mm and has advanced 200 mm from the initial position, they can go back to the original position. In the drawing, the part indicated by the dotted line denotes the limit where the peeling unit 230 cannot be moved any further, and the part indicated by the solid line denotes the original position.

Apart from the above-described method, the first and second peeling units 231 and 232 may be moved again at intervals of about 1 mm in the opposite direction of the direction of movement, without going back to the original position, after they have advanced about 200 mm.

As discussed above, the peeling roller 271 may come into contact with the adhesive pad 226 at a different position for each peeling process while the first and second peeling units 231 and 232 are reciprocating on the second moving unit 236.

However, the above-mentioned about 1 mm and about 200 mm are values that can be changed according to the design and size of the peeling apparatus, and values other than those mentioned above can be included in one embodiment of the present invention. Also, any peeling unit 230 can be included in one embodiment of the present invention without departing from the scope of the present invention in which those skilled in the art can make useful modifications, so long as it can be moved at regular intervals within a moving distance for peeling the protective film F.

The second moving unit 236 is for moving the peeling unit 230 in one direction, and an additional embodiment of the second moving unit 236 will be discussed with reference to different drawings.

Figure 11:
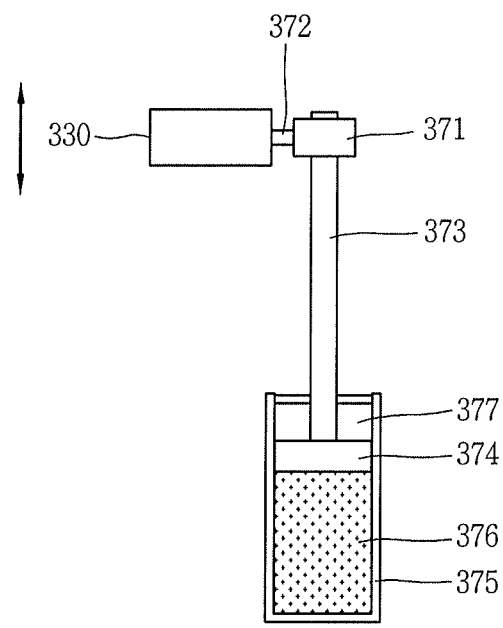
FIG. 11 is a top plan view of a second moving unit according to a third embodiment of the present invention.

FIG. 11 is a top plan view of a second moving unit according to a third embodiment of the present invention.

The second moving unit according to the third embodiment of the present invention may be a cylinder. The cylinder may include a cylinder housing 375, a piston 374, a moving shaft 373, a peeling unit fixing unit 371, and a connecting unit 372.

The cylinder housing 375 may be made of a steel material having high strength, and have a structure for sealing the inside thereof into which the piston 374 is inserted. The internal space of the cylinder housing 375 is divided into a first chamber 376 and a second chamber 377 with respect to the piston 374.

The piston 374 may be formed of a material softer than the cylinder, and may reciprocate within the cylinder housing 375 by an air pressure or pneumatic pressure.

The moving shaft 373 is connected to the piston 374, and is capable of performing mechanical operations while being expanded and contracted repeatedly by the motion of the piston 375. The moving shaft 373 may be in the shape of a hollow pipe.

The peeling unit fixing unit 371 and the connecting unit 372, which are disposed in an area of the moving shaft 373, fix the peeling unit 330 to the moving shaft 373 to allow the peeling unit 330 to be moved along with the movement of the moving shaft 373. In the drawing, the dotted part indicates a position where the peeling unit 330 can be moved.

Figure 12:
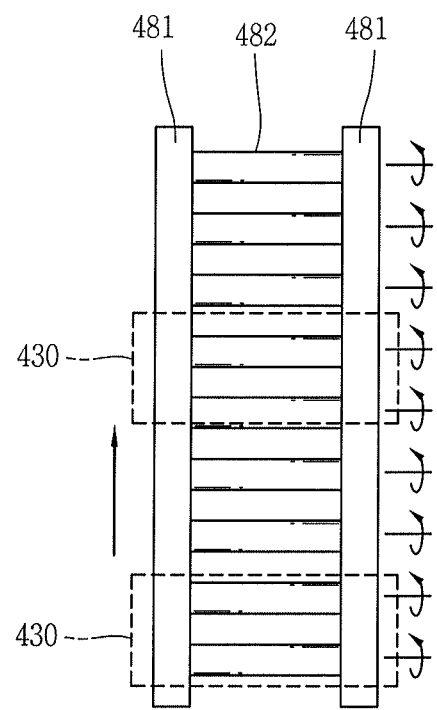
FIG. 12 is a top plan view of a second moving unit according to a fourth embodiment of the present invention.

FIG. 12 is a top plan view of a second moving unit according to a fourth embodiment of the present invention.

The second moving unit according to the fourth embodiment of the present invention may be a plurality of rotating rods 482.

The rotating rods 482 may be disposed vertically to the length direction of the ball screw of the second embodiment. As the plurality of rods 482 are rotated in the movement direction of the peeling unit 430, they can move the peeling unit 430.

The plurality of rotating rods 482 have no spiral grooves, unlike the ball screw, and may have sleek surfaces.

The rotating rods 482 include a stopper 481 for supporting the rotating rods 482 on the rotation shaft on both sides thereof. A motor may be integrated within the stopper 481 to simultaneously rotate the plurality of rotating rods 482 in the same direction.

Besides, the second moving unit may be a linear motor, as well as they may be the plurality of rotating rods 482 and the cylinder. The linear motor also includes a moving shaft and a mover, and is able to reciprocate the peeling unit 430. The linear motor has a big advantage in that it can control movement more precisely than the ball screw and the cylinder do.

The foregoing embodiments of the second moving unit are merely illustrative. Accordingly, the present invention include useful modifications that those skilled in the art can make to the embodiments.

The above-described apparatus and method for peeling a protective film according to the first and second embodiments of the present invention can be used to peel a protective film attached to a patterned retarder. Moreover, the apparatus and method for peeling a protective film may also be used for a method for fabricating a stereoscopic image display. That is, the peeling apparatus and peeling method according to the embodiments of the present invention can be applied to the method for fabricating a display device explained in FIG. 3, and it is possible to fabricate a stereoscopic image display device by rotating a patterned retarder, instead of the polarizer, around the cylindrical plate and replacing the display panel with a stereoscopic image display panel.

With the recent growing interest and development of 3D displays, the competition in the technology of 3D displays is becoming more intense. The main issue in the process of fabricating a 3D display is to provide and attach a patterned retarder precisely. Therefore, the method for fabricating a stereoscopic image display according to an embodiment of the present invention can contribute to a decrease in the defect rate of 3D displays by a precise process, thereby strengthening competitiveness in the 3D market.

Although the present invention has been described with reference to preferred embodiments thereof, it should be understood by those skilled in the art that various modifications and equivalent other embodiments of the present invention can be made.

Accordingly, the present invention is not limited to those embodiments, and various modifications and improvements made by using basic concepts of the present invention defined in the appended claims will fall into the right scope of the present invention.

What is claimed is:

1. A method for peeling a protective film comprising:
    attaching a film member having a protective film to the outer peripheral surface of a cylindrical plate;
    rotating the film member by rotating the cylindrical plate;
    peeling the protective film by adhering a peeling roller of each of a plurality of peeling units to the surface of the protective film and rotating the peeling rollers;
    holding a peeled portion of the protective film by a clamp of each of the peeling units;
    peeling the protective film by moving the peeling units away from the cylindrical plate; and
    moving the peeling units along an axial direction of the cylindrical plate, the peeling units being maintained at the same distance from the outer peripheral surface of the cylindrical plate so that the peeling rollers contact different portions of the surface of a next protective film.

2. The method of claim 1, wherein, moving the peeling units includes moving at least one peeling unit of peeling units at a distance interval one at a time in the axial direction of the cylindrical plate.

3. The method of claim 2, wherein the peeling units comprise a first peeling unit and a second peeling unit disposed on the same line of a side portion of the cylindrical plate, the first peeling unit and the second peeling unit being spaced apart from each other and linearly movable toward each other or away from each other.

4. The method of claim 3, wherein the distance interval is about 1 mm, and further comprising repeatedly moving at least one peeling unit of the first peeling unit and the second peeling unit at the distance interval, wherein when the at least one peeling unit of the first peeling unit and the second peeling unit has advanced about 200 mm away from an initial position, each of the first and second peeling units is moved back to the initial position.

5. The method of claim 3, wherein the distance interval is about 1 mm, and further comprising repeatedly moving the first peeling unit and the second peeling unit at the distance interval, wherein when the first peeling unit and the second peeling unit have advanced about 200 mm away from an initial position, each of the first and second peeling units is moved at the distance interval of about 1 mm one at a time toward the initial position.

6. The method of claim 1, wherein moving the peeling unit includes moving the peeling unit by one of a ball screw, a cylinder, a linear motor, and a plurality of rotating rods, which is installed under the peeling unit.

7. The method of claim 6, wherein moving the peeling unit includes rotating a ball screw installed under the peeling unit by a servo motor to move the peeling unit by the rotation of the ball screw.

8. The method of claim 1, further comprising moving the peeling unit to an original position after peeling the protective film.

9. The method of claim 1, wherein attaching the film member includes applying an adhesive pad on the outer peripheral surface of the cylindrical plate.

10. The method of claim 1, wherein the film member is a patterned retarder.

11. The method of claim 1, wherein the protective film is a film for protecting an adhesive film of the film member.

12. A method for fabricating a stereoscopic image display device, the method comprising:
    attaching a rear surface of a patterned retarder having a protective film on an outer peripheral surface of a cylindrical plate, the protective film protects an adhesive film on the cylindrical plate;
    rotating the cylindrical plate to rotate the patterned retarder;
    contacting a peeling roller of each of a plurality of peeling units to a surface of the protective film at a side portion of the cylindrical plate and then rotating the peeling roller to peel the protective film;
    fixing a peeled portion of the protective film by a clamp of each of the peeling units;
    peeling totally the protective film by moving the peeling unit away from the cylindrical plate;
    moving the peeling units along an axial direction of the cylindrical plate, the peeling units being maintained at the same distance from the outer peripheral surface of the cylindrical plate so that the peeling rollers contact different contact portions of a next protective film; and
    rotating the patterned retarder to attach on a front surface of a stereoscopic image display panel.

13. The method of claim 12, wherein moving the peeling units includes moving at least one peeling unit of peeling units at a distance interval one at a time in the axial direction of the cylindrical plate.

14. The method of claim 13, wherein the peeling units comprise a first peeling unit and a second peeling unit disposed on the same line of a side portion of the cylindrical plate, the first peeling unit and the second peeling unit being spaced apart from each other and linearly movable toward or away from each other.

15. The method of claim 14, wherein the distance interval is about 1 mm, and further comprising repeatedly moving at least one peeling unit of the first peeling unit and the second peeling unit at the distance interval, wherein when the at least one peeling unit of the first peeling unit and the second peeling unit has have advanced about 200 mm from an initial position, each of the first and second peeling units is moved back to the initial position.

16. The method of claim 14, wherein, in the step of moving the peeling units, the first peeling unit and the second peeling unit are repeatedly moved in the axial direction of the cylindrical plate, and when the first peeling unit and the second peeling unit have advanced about 200 mm from the initial position, each of the first and second peeling units is moved at the distance interval of about 1 mm one at a time toward the initial position.

* * * * *